April 14, 1953  L. S. WILLIAMS  2,634,966
WEIGHING SCALE CHECK LINK
Filed July 27, 1948  2 SHEETS—SHEET 1
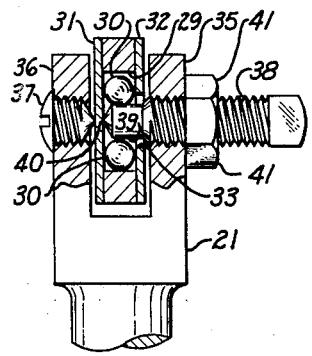
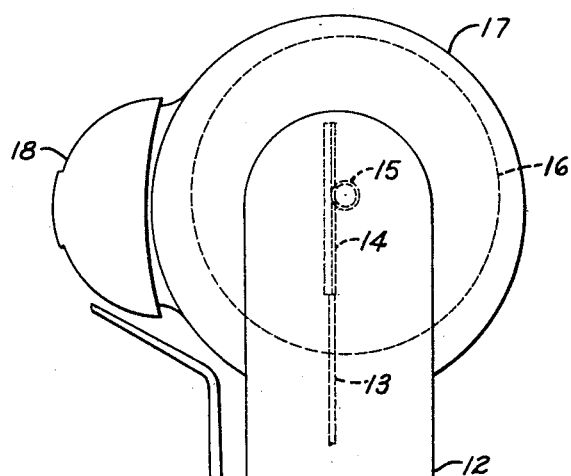
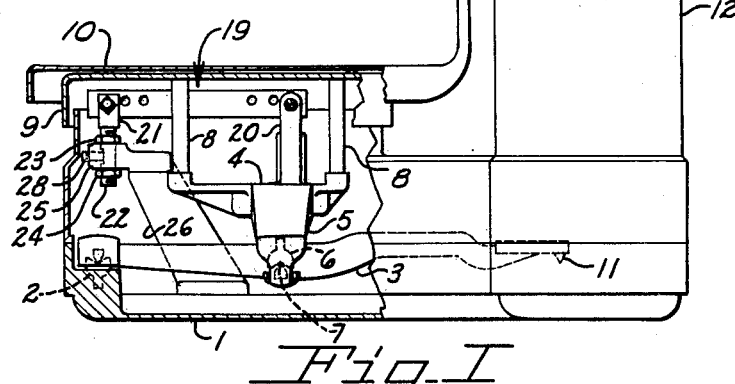
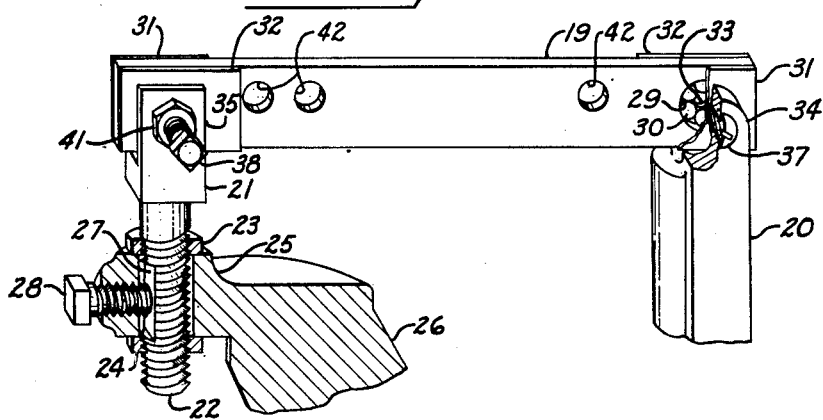
INVENTOR.
Lawrence S. Williams
BY
Marshall, Marshall and Leonard
ATTORNEYS

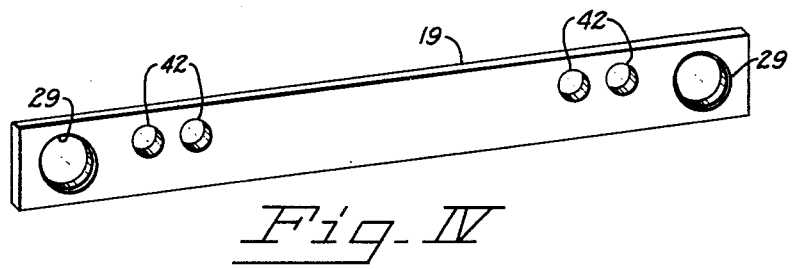
*Fig. IV*
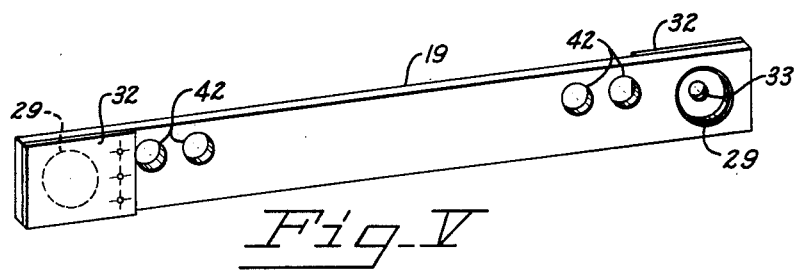
*Fig. V*
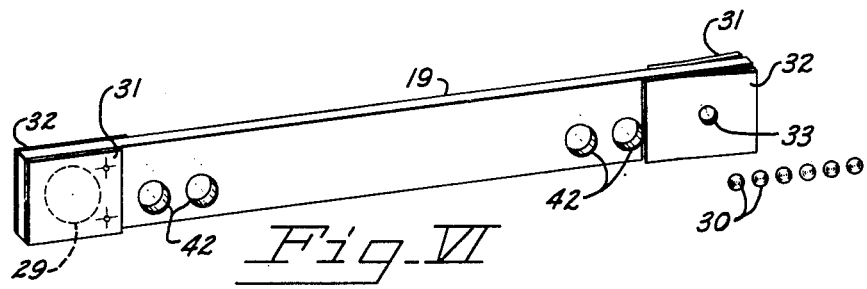
*Fig. VI*
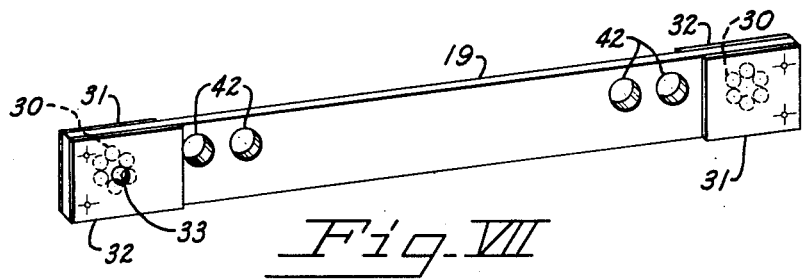
*Fig. VII*

Patented Apr. 14, 1953

2,634,966

UNITED STATES PATENT OFFICE 2,634,966

WEIGHING SCALE CHECK LINK

Lawrence S. Williams, Toledo, Ohio, assignor to Toledo Scale Company, Toledo, Ohio, a corporation of New Jersey Application July 27, 1948, Serial No. 40,883

3 Claims. (Cl. 265—27)

This invention relates to weighing scale check links and in particular to an improved structure that is easy to manufacture and to adjust when installed in a scale.

Any weighing scales having a platter located above a lever and supported from a pair of aligned knife edges or a single extended knife edge of the lever require a check link to keep the platter in position. In order that the scale shall weigh accurately for all positions of the load on the platter, it is necessary that the effective length of the check link shall be exactly equal to the distance between the fulcrum and load knife edges of the lever and that the check link be exactly parallel to the pivot line of the lever for all positions occupied by the lever during normal weighing operation.

It has been customary, in order to secure the required accuracy, to employ opposed knife edges and bearings at each end of the check link for pivotally connecting the link to the frame of the scale and to the load receiver that it is to stabilize. The opposed knife edges and bearings at each end of the check link provide a pivoting axis that is able to transmit either a tension or a compression force acting along the length of the check link. The force may be tension or compression depending upon the position of the load on the platter.

Such a construction employing knife edges and bearings is expensive to manufacture and difficult to install and adjust in a scale. The difficulty arises because it is necessary that the pivoting axis provided by the opposed knife edges shall be parallel to the pivoting axis of the lever as well as being located a precise distance from the pivoting axis of the lever.

The principal object of this invention is to provide a simple, easily constructed check link that has extremely low friction and that is easy to adjust.

Another object of the invention is to provide a simple check link in which the force, whether tension or compression, is transmitted along the same line in the check link.

Another object is to provide a simplified method of manufacture of the improved check link.

Other objects and advantages are apparent from the following description in which reference is made to the accompanying drawings.

According to the invention, the improved check link comprises a strip of flat stock which at each end has a transverse bore the periphery of which is hardened to form the bearing race for a plurality of ball bearings, side plates attached to the strip of stock to hold the balls in position, and cone-pointed screws that loosely engage opposite sides of one of the side plates of the check link one of which screws has a cylindrical portion forming the inner race for the balls enclosed within the cylindrical bore. The invention also includes an improved method of manufacturing the improved check link.

The accompanying figures illustrate the installation of the improved check link in a weighing scale and also the successive steps in the manufacture of the check link.

In the drawings:

Figure I is a side elevation, with parts broken away and other parts shown in section, of a scale employing the improved check link.

Figure II is an enlarged perspective view of the improved check link and fragments of the structure connected thereto.

Figure III is a fragmentary vertical section taken through one end of the improved check link and the connected structure.

Figures IV, V, VI and VII illustrate the check link during successive stages of its manufacture.

These specific figures and the accompanying description are intended merely to illustrate the invention but not to impose limitations on the claims.

A weighing scale incorporating a check link according to the invention comprises a base 1 in which are fitted V-bearings 2 to receive fulcrum knife edges of a weighing lever 3. A spider 4, having laterally extending arms 5 containing V-bearings 6 resting on load knife edges 7 of the lever 3, has uprights 8 the upper ends of which carry a shield 9 and a load receiving platter 10. Forces applied to the load receiving platter 10 are transmitted to the lever 3 and through the lever to its power pivot 11 which is operatively connected to a load counterbalancing mechanism contained within a column 12 erected from the rear portion of the base 1 of the scale. The load counterbalancing mechanism, which forms no part of the instant invention, is not shown in the drawings. The load counterbalancing mechanism is operatively connected through a rack rod 13 and rack 14 to a pinion 15 mounted on the shaft of a drum chart 16. The chart 16 is enclosed within a substantially cylindrical housing 17 surmounting the column 12. Magnifying glasses mounted within a viewing hood 18 provide enlarged images of weight or computed amount indicia that are printed or otherwise marked on the cylindrical chart 16.

The platter 10 is held in operative relation to the remainder of the scale by a check link 19 one end of which is pivotally connected to the upper end of an upright 20 erected from the central portion of the spider 4 and the other end of which is pivotally mounted in a yoke 21 forming the upper end of a threaded stem 22. The threaded stem is held in adjusted vertical position by lock nuts 23 and 24 that are threaded on the stem 22 and that engage the upper and lower surfaces of a boss 25 forming the upper end of a pedestal 26 erected from the base 1 of the scale.

The threaded stem 22 has a flat 27 cut in one side, which flat is engaged by the inner end of a set screw 28 threaded through the side of the boss 25. The flat 27 and set screw 28 serve to hold the yoke 21 at the upper end of the stem 22 in line with the check link 19 as the stem 22 is adjusted vertically.

The check link 19, formed from a flat strip of material, has a bore 29 at each end in which bores a plurality of bearing balls 30 are fitted. Retaining plates 31 and 32 attached to the sides of the check link 19 serve to hold the balls 30 in position. Since the thickness of the check link 19, its dimension along the length of the bores cut in its ends, is slightly greater than the diameter of one of the balls, it follows that the balls are loosely held and free to revolve as may be necessary in providing a frictionless pivotal connection. The plates 32, one at each end of the check link 19, are perforated thus providing holes 33 that are coaxial with respect to the bores 29 and somewhat larger in diameter than a circle that is tangent to the innermost points of the balls 30.

The upper end of the upright 20 of the spider 4 is bifurcated to provide arms 34 that are similar in function to legs 35 and 36 of the yoke 21.

Each of the pivotal connections between the check link 19 and the yoke 21 or the upright 20 comprises a first cone-pointed screw 37 the conical tip of which engages the outermost surface of the plate 31 at a point that is coaxial with the bore 29 of the check link 19. This cone-pointed screw 37 prevents rubbing contact between the side of the plate 31 and the adjacent surface of the leg 36.

A second screw 38 threaded through the leg 35 of the yoke 21 has a cylindrical shank 39 terminating in a conical point 40 which lightly engages the inner surface of the side plate 31 so as to prevent movement of the check link away from the conical point of the screw 37. The cylindrical shank 39 of the screw 38 forms the inner race for the bearing balls 30. The clearance between the cone points of the screws 37 and 38 and hence the side play of the check link is adjusted by turning the screw 38 in or out and the screw is held in adjusted position by a lock nut 41 that is tightened against the side of the yoke 21.

A small amount of clearance must be provided to prevent binding between the check link 19, the bearing balls 30, and the cylindrical shank 39 of the screw 38. This binding would be aggravated if the check link 19 were in neutral or unstable equilibrium so that it would tend to tip over sideways instead of remaining upright as shown in the drawings. This tendency to tip sideways may be minimized by lightening the upper half of the check link 19 by drilling therethrough a series of holes 42. Similar results can be obtained by adding weight to the lower half of the check link or by locating the bores 29 non-symmetrically with respect to the horizontal centerline of the check link so that the greater portion of the check link lies below a line connecting the centers of the bores.

The peripheries of the bores 29 and the shanks 39 of the screws 38 are hardened and ground to minimize the friction that would otherwise result if the balls 30 slightly indented the surfaces with which they cooperate.

This structure is ideally suited for use in a check link because the distance between the bores 29 at the ends of the check link may be precisely determined during the machining of the check link so that this distance corresponds precisely with the pivot distance of the lever 3. The parallel condition between the check link and the lever is obtained by adjusting the stem 22 vertically through the boss 25 of the pedestal 26. Further adjustments are not required because the line of action of the force transmitted through the check link 19 is in the plane of the balls 30 at each end of the check link. Since these balls are in line, the effective distance as well as the parallelism between the line of force and the pivot line of the lever is independent of slight variations or deviations of the screws 38 from exact parallelism with the fulcrum or load pivot lines of the lever 3. As a result, this check link, even if its support is not exactly in line, provides satisfactory performance when used in a weighing scale and because of the elimination of several adjustments is considerably easier to install and adjust.

The various steps in the manufacture of the improved check link are illustrated in Figures IV to VII inclusive. Thus in Figure IV the holes 42 have been drilled in the check link bar 19 and the bores 29 have been drilled and their edges lightly beveled. Furthermore, the ends of the bar 19 including the peripheries of the bores 29 have been heat treated to harden the bores 29 as required for satisfactory operation with the balls. In addition, the bores 29 may at this stage be ground if desired to still further improve the surface finish.

As shown in Figure V, the side plates 32 have been added as by spot welding along the edge of one end only of the plates 32 so that the plates are free to spring outwardly away from the check link bar 19 at their outermost ends. Also at this stage the holes 33 are drilled or otherwise cut in the side plates 32. The fixture or jig for locating the holes 33 may, and preferably does, employ the periphery of the bores 29 as a reference surface in locating the holes 33. Thus it is comparatively simple to maintain the exact coaxial relationship between the holes 33 and the bores 29 without the necessity of using expensive locating equipment.

After the holes 33 have been drilled the other side plates 31 are attached to the ends of the check link 19 again by welding or other suitable attaching means employed at one end only of each of the side plates. This step is illustrated at the left end of the bar as shown in Figure VI.

The next step involves the introduction of the bearing balls 30 into the bores 29. This is accomplished by introducing the balls through the holes 33 and allowing them to spread out to occupy the periphery of the bore. In this embodiment of the invention, since six bearing balls 30 are employed in each bore 29, the diameter of the cylindrical shank 39 on the end of the screw 38 is made slightly larger than the diameter of one of the balls 30 and the diameter of the bore 29 is made slightly larger than three times the diameter of a ball. Thus, six balls will substantially fill each of the bores 29. Since the balls 30 are introduced from the center of the ring and have to pass to the outside and since there is insufficient clearance (if they are all retained in the same plane) to permit the sixth ball to move from the center of the bore 29 to its allotted space in the ring, the side plates 31 and 32 are sprung away from the check link bar 19 far enough to allow the first five balls to move out of the common plane and thus provide clearance to permit the sixth ball to slip into place in the ring.

After the sixth ball is in place and the plates 31 and 32 have sprung back to their original position, the plates are welded or otherwise secured at their previously free ends to prevent such springing action when the check link is in use. This final welding operation completes the manufacture of a check link and it is then ready for installation in the weighing scale.

The simplicity of manufacture of this check link, as compared to the manufacture of conventional check links, is readily apparent when one considers that the only precise dimensions to be maintained are the spacing and diameters of the bores 29 and the diameters of the cylindrical shanks 39 of the screws 38. The location of the holes 33 is easily accomplished because of the adjacent reference surfaces—the peripheries of the bores 29—and the remaining operations such as drilling the holes 42 and welding the plates 31 and 32 do not contribute to the dimensions of the check link and, therefore, need not be precision operations.

Various modifications may be made in the improved check link without departing from the spirit and scope of the invention.

Having described the invention, I claim:

1. In a weighing scale, a check link comprising a flat bar having a transverse circular bore at each end, a flat plate attached to each side at each end of the bar for closing the ends of the bores, one of the plates at each end of the bar having an opening coaxial with and smaller than the bore, and a plurality of balls disposed in a circle contained within each bore, the balls having diameters slightly less than the thickness of the flat bar between the flat plates.

2. In a weighing scale, a check link comprising a flat bar having a transverse circular bore at each end the diameter of which bore is approximately three times the thickness of the bar, a flat plate affixed to each side of each end of the bar to close the ends of the bores, and a plurality of balls contained within each bore, each of the balls having a diameter slightly less than the thickness of the bar between the plates, one only of the plates at each end of the bar having a hole the diameter of which is greater than the diameter but less than twice the diameter of a ball.

3. In a weighing scale, a check link assembly comprising a first yoke supported from the frame of the scale, a second yoke attached to the part to be guided, a check link bar having at each end a transverse bore, a plurality of balls contained in each bore, a pair of plates one of which is perforated attached to each end of the bar for retaining the balls, a pin carried in each yoke and adapted to engage the balls, and a second pin carried in each yoke in axial alignment with the first pin, said pins being pointed to loosely engage the sides of the unperforated plate to retain the check link bar in position.

LAWRENCE S. WILLIAMS.

References Cited in the file of this patent

UNITED STATES PATENTS

| Number | Name | Date |
| --- | --- | --- |
| 869,135 | Burbank | Oct. 22, 1907 |
| 1,686,732 | Cheetham | Oct. 9, 1928 |
| 1,810,093 | Timson | June 16, 1931 |
| 1,834,938 | Conard | Dec. 8, 1931 |
| 1,837,601 | Wetzel | Dec. 22, 1931 |
| 1,899,436 | Fletcher | Feb. 28, 1933 |
| 1,941,849 | Meyers et al. | Jan. 2, 1934 |
| 2,013,961 | Hurt | Sept. 10, 1935 |
| 2,090,288 | Eschenbacher et al. | Aug. 17, 1937 |
| 2,144,845 | Kniesche | Jan. 24, 1939 |
| 2,387,202 | Williams | Oct. 16, 1945 |
| 2,464,511 | James | Mar. 15, 1949 |
| 2,545,908 | Weckerly | Mar. 20, 1951 |